United States Patent
Yamada

(10) Patent No.: US 8,314,849 B2
(45) Date of Patent: Nov. 20, 2012

(54) SHAPE MEASURING DEVICE

(75) Inventor: Tomoaki Yamada, Tokyo (JP)

(73) Assignee: Nikon Corporation, Tokyo (JP)

( * ) Notice: Subject to any disclaimer, the term of this patent is extended or adjusted under 35 U.S.C. 154(b) by 119 days.

(21) Appl. No.: 12/879,712

(22) Filed: Sep. 10, 2010

(65) Prior Publication Data

US 2010/0328484 A1     Dec. 30, 2010

Related U.S. Application Data

(63) Continuation of application No. PCT/JP2009/054526, filed on Mar. 10, 2009.

(30) Foreign Application Priority Data

Mar. 11, 2008 (JP) ................ P2008-061139

(51) Int. Cl.
    *H04N 5/228*     (2006.01)

(52) U.S. Cl. ..................................... 348/222.1

(58) Field of Classification Search ................ 348/222.1
See application file for complete search history.

(56) References Cited

U.S. PATENT DOCUMENTS

| | | | |
|---|---|---|---|
| 6,988,060 B1 * | 1/2006 | Coon et al. ................... 703/13 |
| 2004/0012775 A1 * | 1/2004 | Kinney et al. ............... 356/237.2 |
| 2004/0046966 A1 * | 3/2004 | Fujita ........................... 356/604 |
| 2004/0263672 A1 | 12/2004 | Yoshida | |
| 2007/0291261 A1 * | 12/2007 | Kobayashi .................... 356/213 |
| 2008/0075324 A1 * | 3/2008 | Sato et al. .................... 382/106 |

FOREIGN PATENT DOCUMENTS

| | | |
|---|---|---|
| EP | 1 491 936 A2 | 12/2004 |
| JP | 55-96406 | 7/1980 |
| JP | 62-19685 | 4/1987 |
| JP | 6-201337 | 7/1994 |
| JP | 10-508107 | 8/1998 |
| JP | 2000-9444 | 1/2000 |
| JP | 3321866 | 6/2002 |
| JP | 2004-226072 | 8/2004 |
| JP | 2005-017805 | 1/2005 |
| JP | 2006-23178 | 1/2006 |
| JP | 2007-46937 | 2/2007 |
| JP | 2007-155379 | 6/2007 |
| WO | 96/41304 | 12/1996 |

OTHER PUBLICATIONS

International Search Report for PCT/JP2009/054526, mailed May 19, 2009.

* cited by examiner

*Primary Examiner* — James Hannett

(74) *Attorney, Agent, or Firm* — Staas & Halsey LLP

(57) ABSTRACT

The present invention relates to a shape measuring device that can improve measurement accuracy. A liquid crystal element 35 projects striped projection patterns whose intensities are changed according to the position in three sinusoidal states with initial phases of 0, 120, and 240 degrees onto an object 2 to be measured, each of a CCD sensor 44 and a CCD sensor 50 picks up an image obtained by forming reflection light from the object 2 to be measured by the projected projection pattern, and a controller 23 evaluates reliability of a measurement result at a position where a position conjugated with an image pickup surface of image pickup means is different along an optical path direction on the basis of each received light amount of each pixel of a plurality of images picked up when at least two projection patterns are projected. As a result, measurement accuracy can be improved. The present invention can be applied to a shape measuring device that measures the shape of an object to be measured.

14 Claims, 8 Drawing Sheets

SHAPE MEASURING DEVICE

CROSS REFERENCE TO RELATED APPLICATIONS

This application is a continuation application, under 35 U.S.C. §111(a), of international application No. PCT/JP2009/054526 filed, on Mar. 10, 2009, which claimed priority to Japanese application No. 2008-061139, filed Mar. 11, 2008, the disclosures of which are incorporated herein by reference.

TECHNICAL FIELD

The present invention relates to a shape measuring device and particularly to a shape measuring device for which measurement accuracy can be improved.

BACKGROUND ART

As a method of measuring a three-dimensional shape of an industrial product or the like, a focal method has been widely employed.

As a technology relating to measurement by the focal method, Patent Document 1 is known, for example. In a device disclosed in Patent Document 1, when measurement is to be made by the focal method, pattern light is projected to an object to be measured, and an image of this pattern is picked up by an image pickup system and observed so as to measure a focal position, whereby the shape of the object to be measured is measured.

[Patent Document 1] Japanese Patent No. 2928548

DISCLOSURE OF INVENTION

Problems to be Solved by the Invention

In a prior-art measuring device by the focal method including Patent Document 1, a contrast value is used in general in detection of a focal position. In the method of detecting a focal position using contrast, attention is paid to one pixel and its contrast with pixels around it is calculated, and moreover, a position where the contrast becomes the maximum in comparison with positions in the focal direction is set as a Z coordinate of the pixel.

However, since a light flux converged to one spot on the pixel is converged with a certain aperture angle, unless the aperture angle is constant all the time for any shape, accuracy is varied, and measurement accuracy is not sufficient in some cases.

Moreover, in the prior-art method, since an amplitude of brightness of the projection pattern is modulated by irregularity on a surface of the object to be measured, the amplitude is small in a unfocused portion while the amplitude appears large in a focused portion, which results in a problem of noise of an unnecessary frequency component caused by its influence.

The present invention was made in view of the above circumstances and has an object to improve measurement accuracy.

Means for Solving the Problems

A first shape measuring device of the present invention is provided with, in a shape measuring device that has projecting means that projects a projection pattern to a surface to be measured; an image-forming optical system that forms an image of the projection pattern projected to the surface to be measured; image pickup means that picks up an image of the projection pattern; and focusing detecting means that detects a focusing state at each position of the image obtained by the image pickup means and measures the shape of the surface to be measured, conjugated position changing means that changes a position conjugated with an image pickup surface of the image pickup means with respect to the surface to be measured along the optical axis direction of the image-forming optical system;

calculating means that detects a change of the position of the projection pattern on the basis of a plurality of images obtained by the image pickup means when the conjugated position is changed with respect to the surface to be measured; and evaluating means that evaluates a detection error of the focusing state detected by the focusing detecting means on the basis of the change of the position of the projection pattern detected by the calculating means.

The projection pattern is a pattern having a cyclic nature.

The projecting means projects three or more of sinusoidal patterns with different brightness at the same projection position as the projection pattern.

The calculating means estimates a normal line of the surface to be measured from the change of the position of the image of the projection pattern when the conjugated surface is changed along the optical axis direction.

The calculating means determines if the normal line direction of the surface to be measured is within a predetermined range or not and if the normal line direction is determined to be outside the predetermined range, the calculating means prompts a user to make re-measurement in a state in which directions of the image-forming optical system and the surface to be measured are changed.

The image-forming optical system is provided with diaphragms with different aperture regions that shield the half of the optical path of the image-forming optical system at a pupil position thereof or a position conjugated with the pupil position, the image pickup means obtains two images at a position where the conjugated position is the same as the image pickup surface in a state the regions shielded by the diaphragms are different, and the focusing detecting means detects the focusing state between the surface to be measured and the image pickup surface of the image pickup means on the basis of presence of a position change of the projection pattern obtained from the two images.

Spatial frequency selecting means is further provided that expands a picked-up image for each constituting spatial frequency component;

cuts off a frequency component other than for a region of the spatial frequency obtained by adding/subtracting a spatial frequency according to a surface state of the surface to be measured set in advance to/from the spatial frequency component of the projection pattern with respect to the expanded spatial frequency; and re-expands a frequency response obtained by cutting off the frequency component to a spatial coordinate.

A second shape measuring device of the present invention is provided with:

in a shape measuring device that measures the shape of an object to be measured, expanding means that expands an image obtained by picking up an image formed by reflection light from a surface to be measured by a projected projection pattern for each constituting spatial frequency component;

a filter that cuts off a frequency component other than for a region of the spatial frequency obtained by adding/subtracting the spatial frequency according to the surface state of the surface to be measured set in advance to/from the spatial frequency component of the projection pattern with respect to the expanded spatial frequency; and re-expanding means that re-expands the frequency response obtained by cutting off the frequency component into a spatial coordinate.

Advantages of the Invention

According to the present invention, measurement accuracy can be improved.

Figure 1:
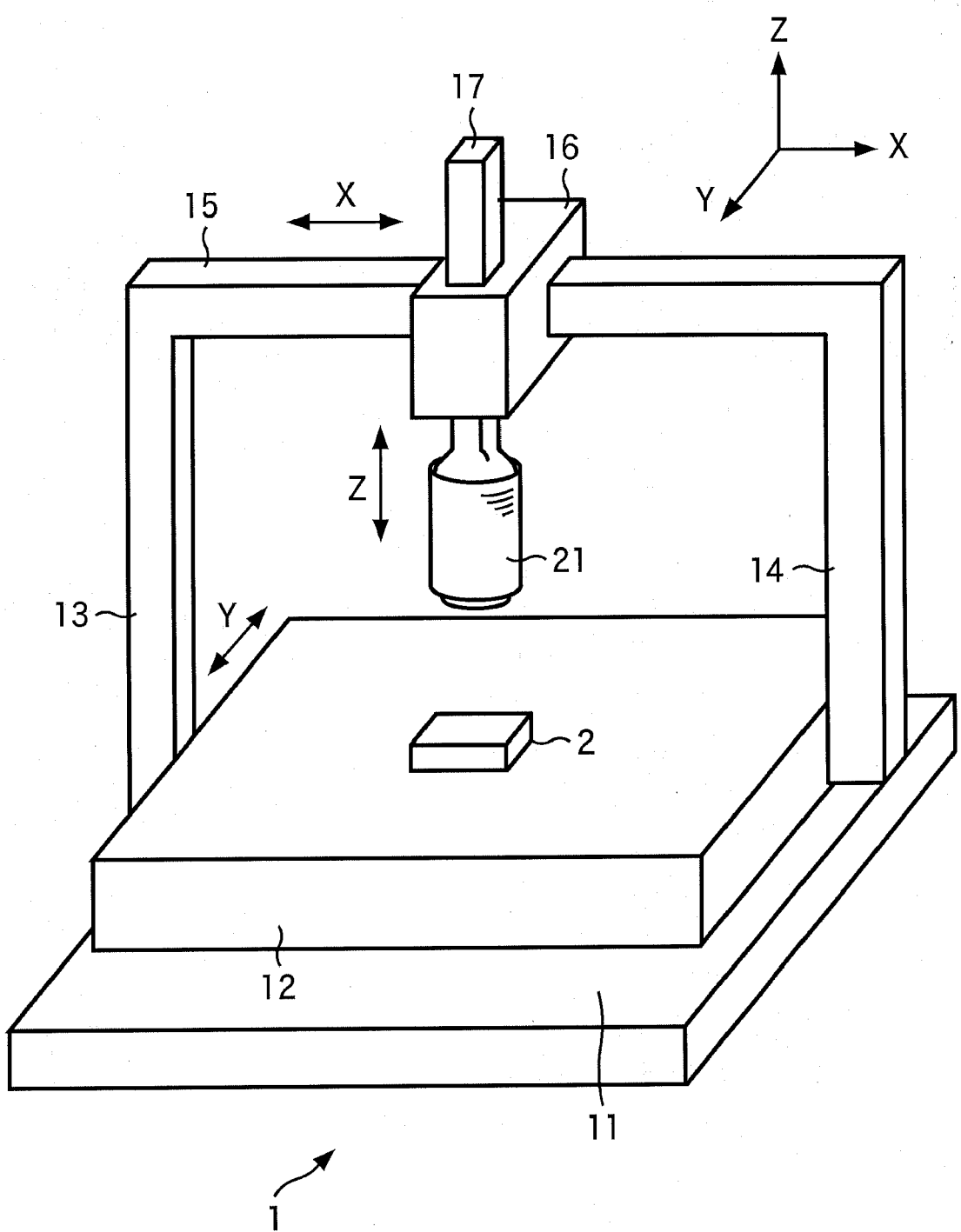
FIG. 1 is an outline view illustrating an entire configuration of a shape measuring device.

DESCRIPTION OF SYMBOLS 1 shape measuring device
11 mount
12 stage
13 supporting column
14 supporting column
15 X-axis guide
16 slider
17 Z-axis guide
21 measuring portion
22 image processing portion
23 controller
31 light source
32 condenser lens
33 pupil diaphragm
34 relay lens
35 liquid crystal element
36 relay lens
37 half prism
38 objective lens
39 half prism
40 relay lens
41 relay lens
42 pupil diaphragm
43 image-forming lens
44 CCD sensor
45 mirror
46 relay lens
47 relay lens
48 pupil diaphragm
49 image-forming lens
50 CCD sensor
71 FFT portion
72 filter
73 inverse FFT portion
81 focal-position calculation portion
82 normal-line calculation portion
83 normal-line appropriateness determination portion

BEST MODE FOR CARRYING OUT THE INVENTION

An embodiment of the present invention will be described below referring to the attached drawings.

FIG. 1 is an outline view illustrating an entire configuration of a shape measuring device.

As shown in FIG. 1, in a shape measuring device 1, a stage 12 on which an object 2 to be measured as a measurement target is placed is attached to a mount 11, and this stage 12 is driven in the Y-axis direction by a Y-axis driving mechanism, not shown. Also, at the center part on both side edges of the mount 11, supporting columns 13 and 14 extending upward in the figure are fixed, and an X-axis guide 15 is fixed so as to connect both upper end portions of the supporting columns 13 and 14.

To the X-axis guide 15, a slider 16 movable along the X-axis guide 15 is attached and is driven in the X-axis direction by an X-axis driving mechanism, not shown. Also, to the slider 16, a Z-axis guide 17 is attached and is driven in the Z-axis direction by a Z-axis driving mechanism, not shown. A lower end portion of the Z-axis guide 17 is a spherical body and is fitted into a measuring portion 21 having a semispherical upper recess portion is formed. As a result, the measuring portion 21 can be directed to an arbitrary direction by a rotation driving mechanism, not shown.

By having the configuration as above, the shape measuring device 1 can measure a positional coordinate at an arbitrary position on each surface of the object 2 to be measured and can measure the shape of the object 2 to be measured.

Subsequently, referring to FIG. 2, which is an outline configuration diagram of the measuring portion 21, a configuration of the measuring portion 21 that measures the shape of the object 2 to be measured will be described. The shape measuring device 1 uses a three-dimensional shape measuring method of a light projection type in which a plurality of images are obtained by changing relative positions of a focal surface of an image-forming optical system provided in the measuring portion 21 and the object 2 to be measured.

The measuring portion 21 is provided with a projection optical system including a light source 31, a condenser lens 32, a pupil diaphragm 33, relay lenses 34 and 36, an objective lens 38, and a liquid crystal element 35, a first image-forming optical system including the objective lens 38, relay lenses 40 and 41, a pupil diaphragm 42, and an image-forming lens 43, and a second image-forming optical system including the objective lens 38, relay lenses 46 and 47, a pupil diaphragm 48, and an image-forming lens 49. In each of the image-forming optical systems, a CCD 44 and a CCD 50 are provided separately.

The objective lens 38 is shared by the projection optical system and the first and second image-forming optical systems. In order that a projection pattern is projected to the object 2 to be measured by the same optical axis so as to pick up an image of the object 2 to be measured, the objective lens 38 is shared by them, and a half prism 37 is provided for that purpose. Also, in order to obtain an image of the same region of the object 2 to be measured both by the first image-forming optical system and the second image-forming optical system, a half prism 39 is provided.

The light source 31 is disposed in the projection optical system, and light emitted from the light source 31 enters the pupil diaphragm 33 that gives an appropriate focal depth through the condenser lens 32. The light source 31 uses a light source having even light-amount distribution in a predetermined plane. The light from the condenser lens 32 having passed through the pupil diaphragm 33 is converged to a surface conjugated with a focal surface S of the light projected (radiated) to the object 2 to be measured by the relay lens 34 and enters the liquid crystal element 35.

The liquid crystal element 35 forms a projection pattern whose intensity is changed in accordance with a position in a sinusoidal state in which a bright part and a dark part whose brightness is intermittently changed in a sinusoidal state are formed on the object 2 to be measured. For example, the liquid crystal element 35 forms three projection patterns in which positions of the maximum value of the bright part or the maximum value of the dark part are displaced to a degree that does not reach a pitch of one cycle of bright and dark. Supposing that one cycle is 360 degrees, the three patterns having initial phases of 0, 120, and 240 degrees are projected. The pitches of the cycles of bright and dark in the three patterns are the same.

The cycle of this projection pattern ideally has a finer cycle but since it should be resolved by a pixel on the image pickup side or the optical system, an appropriate cycle is determined, considering the resolution of the optical system, a pixel size or the like. In this embodiment, a pitch of such cycle is set to approximately 10 pixels.

The light having passed through the liquid crystal element 35 and become pattern light enters the half prism 37 through the relay lens 36. The half prism 37 reflects the pattern light from the relay lens 36 and makes it enter the objective lens 38. The objective lens 38 converges the pattern light from the half prism 37 to the predetermined focal surface S and an image of the projection pattern projected to the object 2 to be measured. That is, the pattern generated by the liquid crystal element 35 is projected to the surface of the object 2 to be measured by the relay lens 36, the half prism 37, and the objective lens 38. Also, when the surface of the object 2 to be measured gets together with the focal surface S, the image of the projection pattern is formed on the surface of the object 2 to be measured.

The image of the projection pattern projected to the object 2 to be measured is formed by the first and second image-forming optical systems. In the first and second image-forming optical systems, the light flux from each position is converged by the objective lens 38 from the surface of the object 2 to be measured and is made to enter the half prism 37.

The half prism 37 transmits a part of the light flux having entered the objective lens 38 from the surface of the object 2 to be measured. The transmitted light flux enters the half prism 39. A part of the light flux having entered the half prism 39 passes through a reflection surface of the half prism 39, while the remaining portion of the light flux is reflected on the reflection surface of the half prism 39.

The light flux having passed through the half prism 39 is converged by the relay lens 40 once. Then, each light flux is made into a parallel light flux again at the relay lens 41, which enters the pupil diaphragm 42. The pupil diaphragm 42 is located at the pupil of the optical system from the objective lens 38 to the image-forming lens 43, which will be described later. The shape of an aperture of the pupil diaphragm 42 is as shown on the upper side in FIG. 3, for example, and shields the light reaching regions other than a framed semicircle in the figure in the light flux from the relay lens 41. Then, the light flux having passed through the semicircular portion enters the image-forming lens 43. The semicircle has a diameter substantially equal to the diameter of the light flux reaching the pupil diaphragm 42 and shields the light in the region exactly in the half of the light flux. The image-forming lens 43 converges each light flux having reached and forms an image of the object 2 to be measured. The CCD (Charge Coupled Device) sensor 44 receives the light converged by the image-forming lens 43 on a light receiving surface of the CCD sensor 44 and picks up the image obtained by the first image-forming optical system.

On the other hand, a part of the light flux reflected by the half prism 39 is converged once through a mirror 45 and the relay lens 46. Then, each light flux is made into a parallel light flux again by the relay lens 47 and enters the pupil diaphragm 48. The pupil diaphragm 48 is located at a position of the pupil of the optical system from the objective lens 38 to the image-forming lens 49, which will be described later. The shape of the aperture of the pupil diaphragm 48 is as shown on the lower side in FIG. 3, for example, and shields the light having reached regions other than the framed semicircle in the figure in the light flux from the relay lens 47. Then, the light flux having passed through the semicircular portion enters the image-forming lens 49. This semicircle is also similar to the pupil diaphragm 42. Then, the light having entered the image-forming lens 49 forms an image on the light receiving surface of the CCD sensor 50.

Figure 3:
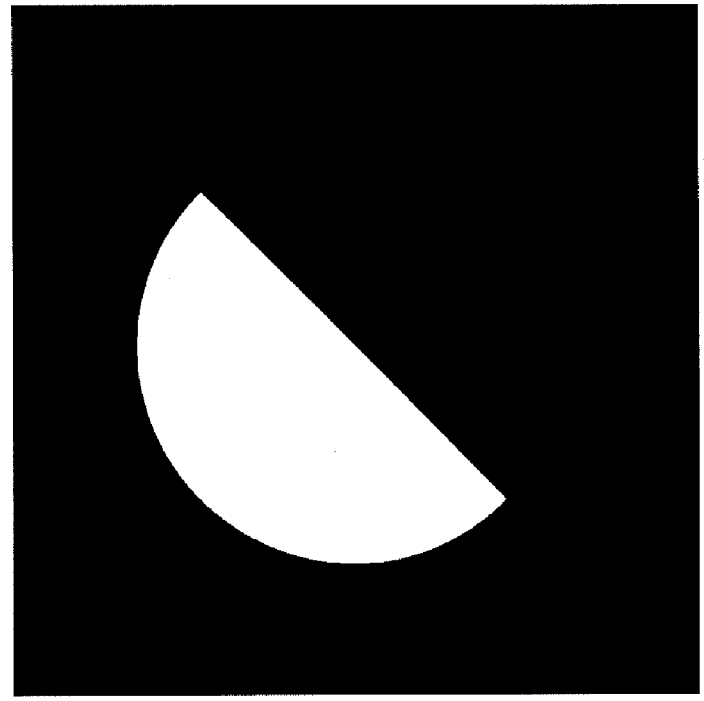
FIG. 3 is a view illustrating examples of a pupil shape.
Figure 3:
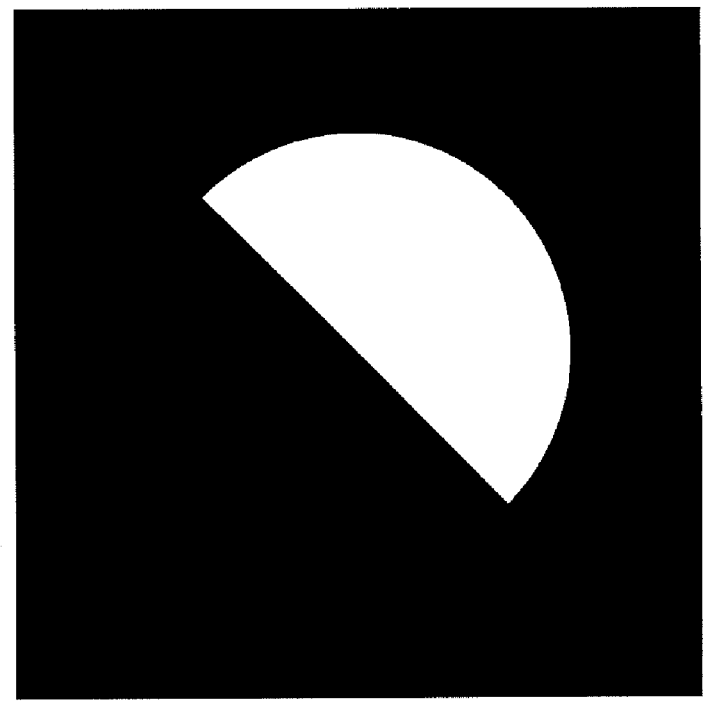

That is, if the light flux shielded by the pupil diaphragm 48 having an aperture in the shape of a pupil on the upper right side in FIG. 3 so as not to have rotational symmetry at the position of the pupil of the optical system is converged by the image-forming lens 49 and the surface of the object 2 to be measured is conjugated with the light receiving surface of the CCD sensor 50, the image is formed on the light receiving surface of the CCD sensor 50, and if the light flux shielded by the pupil diaphragm 42 having an aperture in the shape of a pupil on the lower left side in FIG. 3 so as not to have rotational symmetry at the position of the pupil of the optical system is converged by the image-forming lens 43 and the surface of the object 2 to be measured is conjugated with the light receiving surface of the CCD sensor 44, the image is formed on the light receiving surface of the CCD sensor 50.

In this embodiment, the example provided with the first image-forming optical system and the second image-forming optical system and using two CCD sensors, that is, the CCD sensor 44 and the CCD sensor 50 disposed in each of the optical systems is described, but images of the two pupils may be obtained by one CCD sensor by obtaining respective images while exchanging the two pupil diaphragms shown in FIG. 3 in an optical path having only one image-forming optical system and a light flux converged to a pupil position of the optical system and a conjugated position or one spot of the CCD is a parallel light flux. Also, the shape of the pupil diaphragm is not limited to the semicircle shown in FIG. 3 but may be any shape as long as it is shielded so as not to have rotational asymmetry from the optical-axis center.

Figure 4:
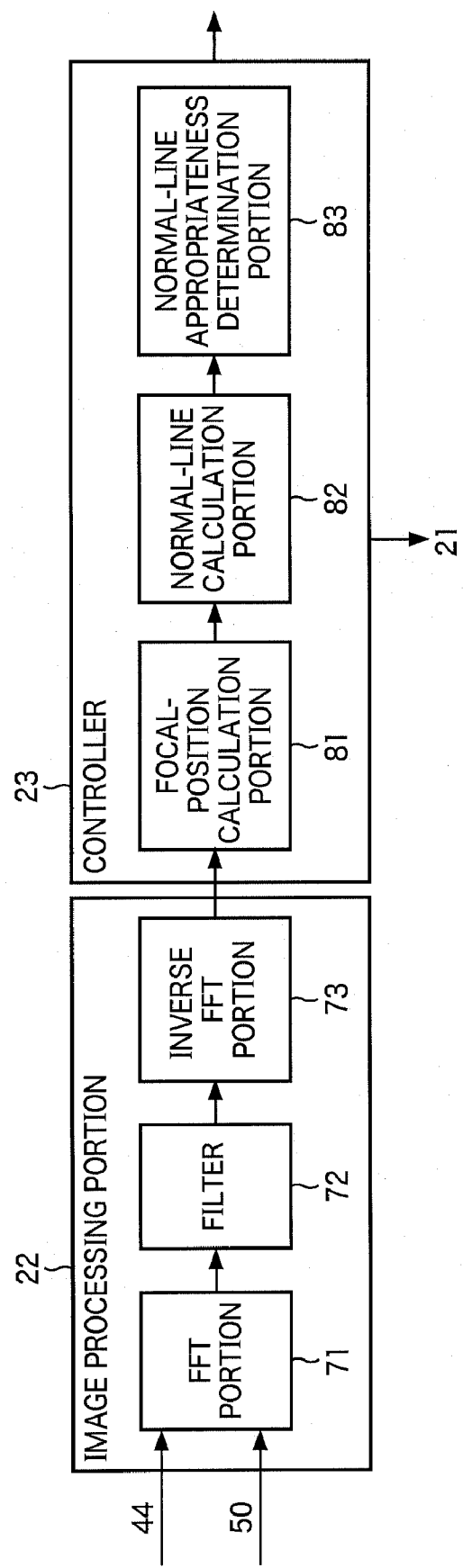
FIG. 4 is a diagram illustrating a configuration example of an image processing portion and a controller.

Returning to FIG. 2, into an image processing portion 22, image data of the object 2 to be measured that was picked up by sequentially projecting the projection patterns whose intensities are changed in the three sinusoidal states of 0, 120, and 240 degrees according to the position from each of the CCD sensor 44 and the CCD sensor 50 is inputted. The image processing portion 22 applies predetermined image processing such as processing to remove a noise component, for example, to each of the image data supplied from the CCD sensor 44 and the CCD sensor 50. Thus, as shown in FIG. 4, in the image processing portion 22, an FFT portion 71, a filter 72, and an inverse FFT portion 73 are provided. However, explanation of the FFT portion 71 and the inverse FFT portion 73 will be omitted here and will be made together with explanation of an operation of the shape measuring device 1, which will be described later.

After that, the image data subjected to the predetermined image processing by the image processing portion 22 is inputted to a controller 23 that controls an operation of each portion in the shape measuring device 1. The controller 23 executes predetermined measurement processing in order to measure the shape of the object 2 to be measured on the basis of the image data from the image processing portion 22 and outputs the measurement result. Therefore, as shown in FIG. 4, in the controller 23, a focal-position calculation portion 81, a normal-line calculation portion 82, and a normal-line appropriateness determination portion 83 are provided. However, the explanation of the focal-position calculation portion 81 to the normal-line appropriateness determination portion 83 will be omitted here and will be made together with explanation of an operation of the shape measuring device 1, which will be described later.

An error range of the focal position might be changed depending on the surface properties of the object 2 to be measured. In this case, a phenomenon can occur that the image-forming positions on the CCD sensor 44 and the CCD sensor 50 of the pattern projected to the object 2 to be measured are made different between a focal state and a non-focal state. A movement amount of the pattern projected to the object 2 to be measured is determined by a design of the image-forming optical system. If the image-forming optical system is a telecentric optical system and the surface of the object 2 to be measured is a diffused surface, even if the position of the image pickup surface of the image pickup element is not conjugated with the surface of the object 2 to be measured, the position of the pattern on the picked-up image is not changed. An error range of the focal position is not changed, either.

Figure 5:
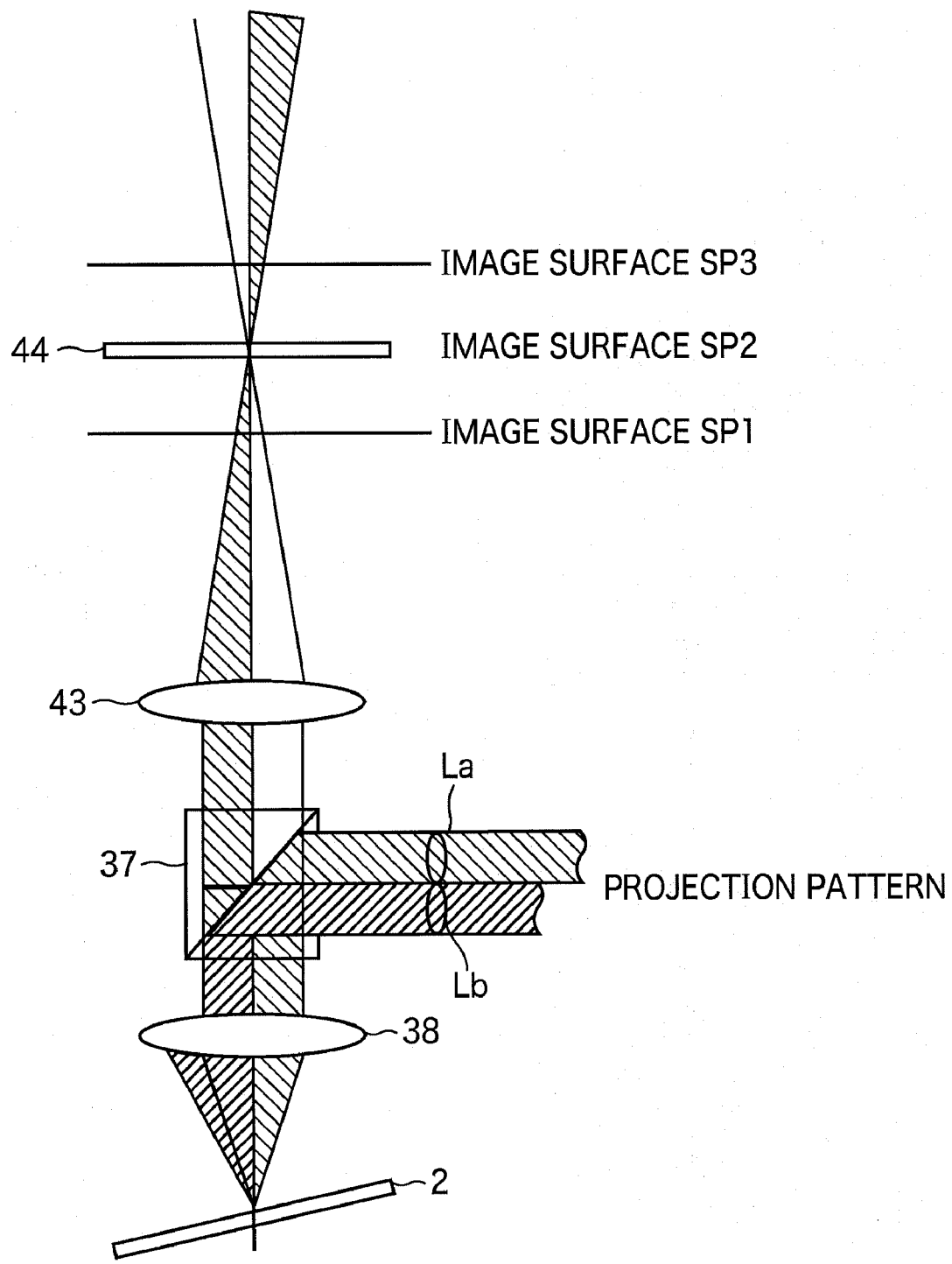
FIG. 5 is a diagram for explaining missing pattern light.

However, if the surface of the object 2 to be measured is a mirror surface as shown in FIG. 5, for example, and the normal line of the surface is inclined with respect to the optical axis of the objective lens 38, the error range of the focal position is changed. Also, at the same time, the image-forming position of the pattern projected to the object 2 to be measured is changed to the vertical direction with respect to the optical axis between the focal state and the non-focal state.

That will be explained using FIG. 5. In FIG. 5, a light flux that is diffused from one point in the liquid crystal element 35, becomes a parallel light flux at the relay lens 36 and enters the half prism 37 is shown. The diameter of the light flux incident to the half prism 37 is the same as the effective diameter of the objective lens 38. The relationship between the CCD sensor 44 and the object 2 to be measured is the same as the relationship with the measuring portion 21 in FIG. 2, but the members not particularly required for the explanation of this phenomenon are omitted.

As for the light flux from one point of the liquid crystal element 35, the parallel light flux converges into one point on the surface of the object 2 to be measured with a certain angle by the objective lens 38. If the surface of the object 2 to be measured is inclined to the optical axis of the objective lens 38, each ray of the light flux is reflected in a direction different from the direction when being converged according to an inclination angle due to a reflection action of the object 2 to be measured. Also, since an expanding angle of the light flux reflected by the surface of the object 2 to be measured is the same as the angle converged by the objective lens 38, the light flux at one point of the pattern projected by the objective lens 38 to the object 2 to be measured is partially missed, and the light flux is eccentrically located and converged by the objective lens 38. For example, in a light flux La on the upper half in the figure and a light flux Lb on the lower half in the figure, the light flux Lb is kicked off by the objective lens 38 and does not enter the CCD sensor 44.

That is, the light flux La enters the surface of the object 2 to be measured from the objective lens 38, is reflected on the surface thereof and enters the CCD sensor 44 through the objective lens 38 and the image-forming lens 43. On the other hand, the light flux Lb enters the surface of the object 2 to be measured from the objective lens 38, is reflected on the surface thereof and then, does not enter the incident pupil of the objective lens and thus, the light flux Lb does not enter the half prism 37. Therefore, in the pattern light projected to the object 2 to be measured, the portion of the light flux Lb is missed.

Here, an image surface SP2 shown in FIG. 5 is a surface located at a position conjugated with the surface of the object 2 to be measured. In the case of the focal state, this is the surface where the light receiving surface of the CCD sensor 44 is arranged. On the other hand, an image surface SP1 is a surface located at a position closer from the object 2 to be measured than the image surface SP2 and is a surface not located at a position conjugated with the object 2 to be measured in a strict meaning. Also, an image surface SP3 is a surface located at a position farther from the object 2 to be measured than the image surface SP2 and is a surface not located at a position conjugated with the object 2 to be measured in a strict meaning.

Since the surface of the object 2 to be measured is a mirror surface and the surface of the object 2 to be measured is inclined to the optical axis of the objective lens 38 as mentioned above, if a part of the light flux is missed and eccentrically located, the size of the image at one point is hardly different as compared with the case in which the light flux from one point of the object 2 to be measured has the same diameter as the effective diameter of the objective lens 38. Therefore, as compared with the case without inclination, if there is an inclined portion on the surface of the object 2 to be measured, which is a mirror surface, measurement at the position in the Z-direction becomes inaccurate.

On the other hand, the position is different according to the image surface SP1 to the image surface SP3. For example, if the object 2 to be measured is inclined, since the light flux Lb is missed, the direction of the major beam of the pattern light incident to the CCD sensor 44 does not become perpendicular to the image surface SP1 to the image surface SP3 but the position of the pattern image is different according to the image surface SP1 to the image surface SP3. Specifically, the position of the pattern image on the image surface SP2 is the same as the case in which the object 2 to be measured is not inclined, but on the image surface SP1, the pattern is located on the left side in the figure rather than the position on the image surface SP2, while on the image surface SP3, the pattern is located on the right side from the position on the image surface SP2.

That is, if the object 2 to be measured is inclined, not only that the focal depth becomes deep with respect to the surface of the inclined object 2 to be measured but also the position of the image before and after the focus is moved. Thus, in this embodiment, the three projection patterns are projected to the object 2 to be measured and it is detected how the image at the position where the object 2 to be measured is located has been moved on the image surface SP1, the image surface SP2, and the image surface SP3 so as to know if the focal accuracy is sufficiently maintained. In this embodiment, the first image-forming optical system and the second image-forming optical system are, as mentioned above, provided with the pupil diaphragms that shield the half of the light fluxes at the pupil positions of the respective optical systems. Thus, depending on the inclination direction of the object 2 to be measured, this phenomenon might not occur only with one of the optical systems. Therefore, in this embodiment, the two image-forming optical systems are provided, and the pupil diaphragms with shielding areas different from each other are provided so as to solve this problem.

Figure 2:
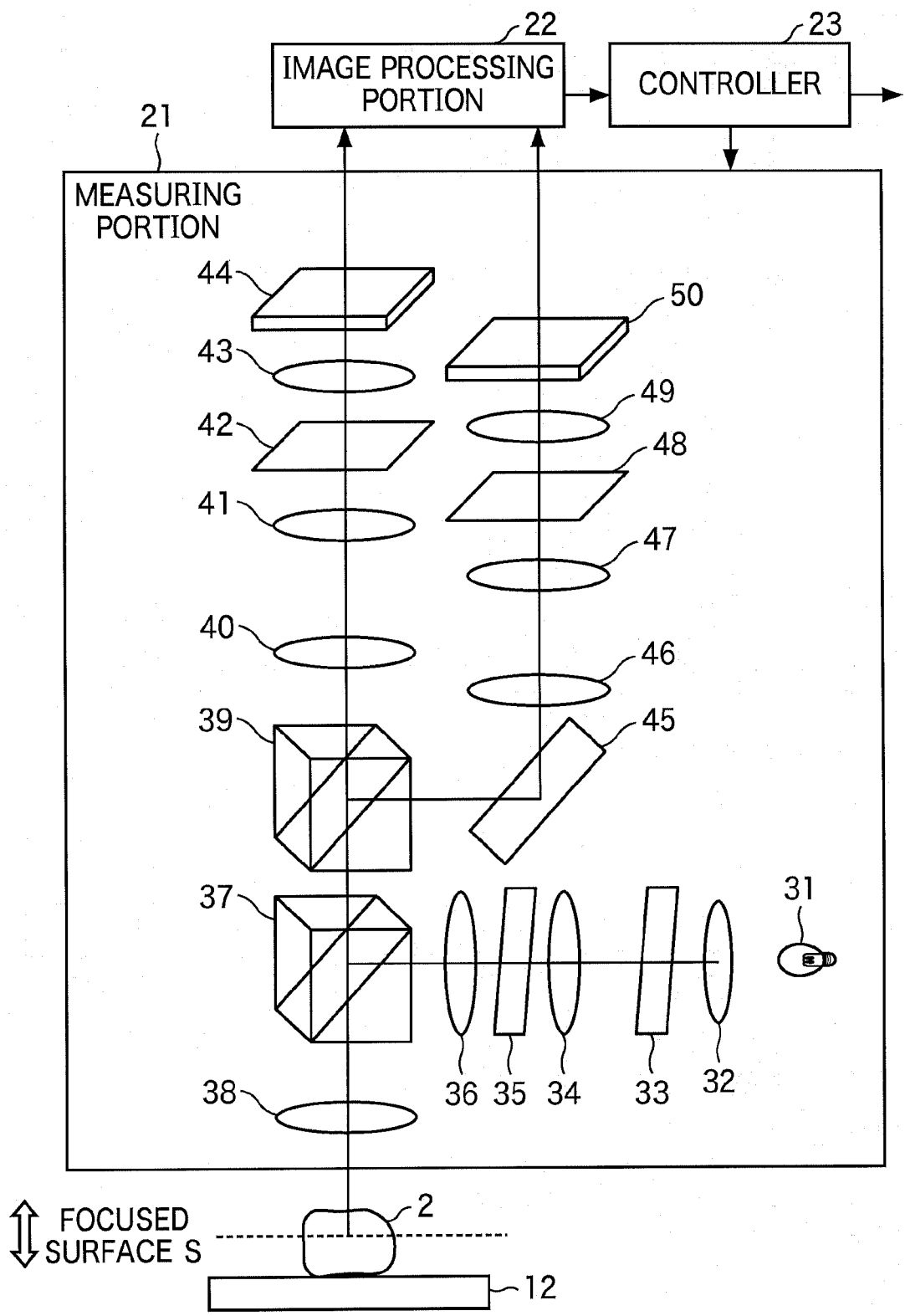
FIG. 2 is a diagram illustrating a configuration example of an embodiment of the shape measuring device to which the present invention is applied.

In FIG. 5, for simplification of the explanation, descriptions on the half prism 39, the relay lens 40, the relay lens 41, the pupil diaphragm 42, and the image-forming lens 43 shown in corresponding FIG. 2 are omitted.

Subsequently, an operation of the shape measuring device 1 will be described.

Figure 6:
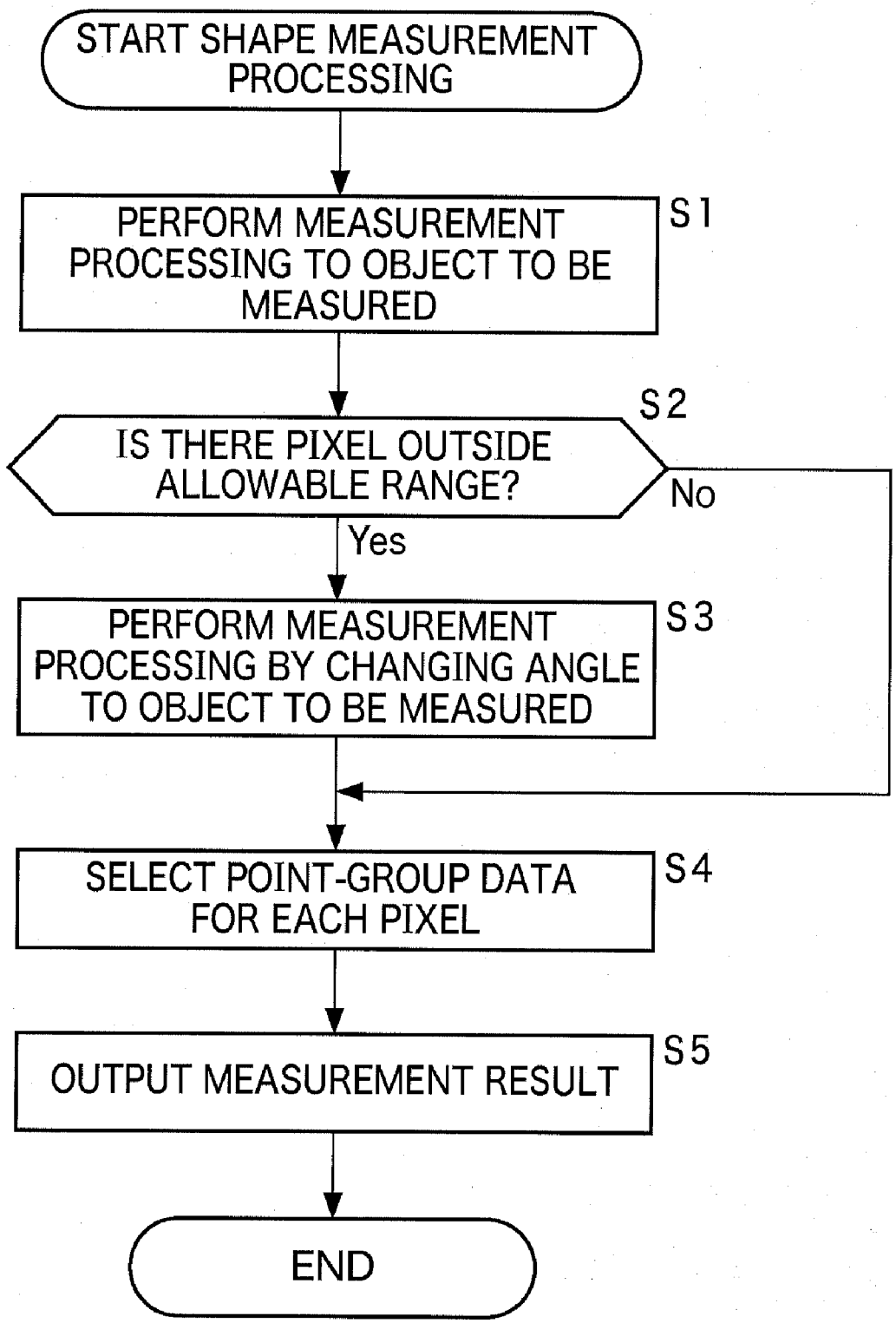
FIG. 6 is a flowchart for explaining shape measurement processing.

FIG. 6 is a flowchart for explaining processing for measuring the shape of the object 2 to be measured by the shape measuring device 1 (hereinafter referred to as shape measurement processing). In the following explanation, in order to simplify the explanation, the object to be measured side and the CCD sensor side are both telecentric optical systems.

At Step S1, the shape measuring device 1 executes the measurement processing for the object 2 to be measured. Here, the term perpendicular refers to the state in which an elevation angle and a rotation angle to the object 2 to be measured of the measuring portion 21, which is a measurement system, or in more detail, the surface of the stage 12 on which the object 2 to be measured is placed are 0 degrees.

The elevation angle to the stage 12 in the measurement system is an angle indicating how the measurement system is inclined to the stage 12 and indicates an angle in the rotation direction of the measurement system with a straight line perpendicular to the normal line of the (the surface of the) stage 12 as the axis. That is, the elevation angle shows an angle to rotate the measurement system using the straight line perpendicular to the normal line as the axis so that the normal line of the stage 12 becomes parallel with the optical axis of the objective lens 38.

Also, the rotation angle to the stage 12 of the measurement system is an angle indicating how the measurement system is inclined to the stage 12 and is shown as an angle in the rotation direction of the measurement system with an axis orthogonal to both the normal line of the stage 12 and the axis in the elevation angle. Therefore, by inclining the measurement system so as to obtain appropriate elevation angle and rotation angle, the optical axis of the measurement system, that is, the optical axis of the objective lens 38 can be made parallel with the normal line of the surface on the object 2 to be measured.

Figure 7:
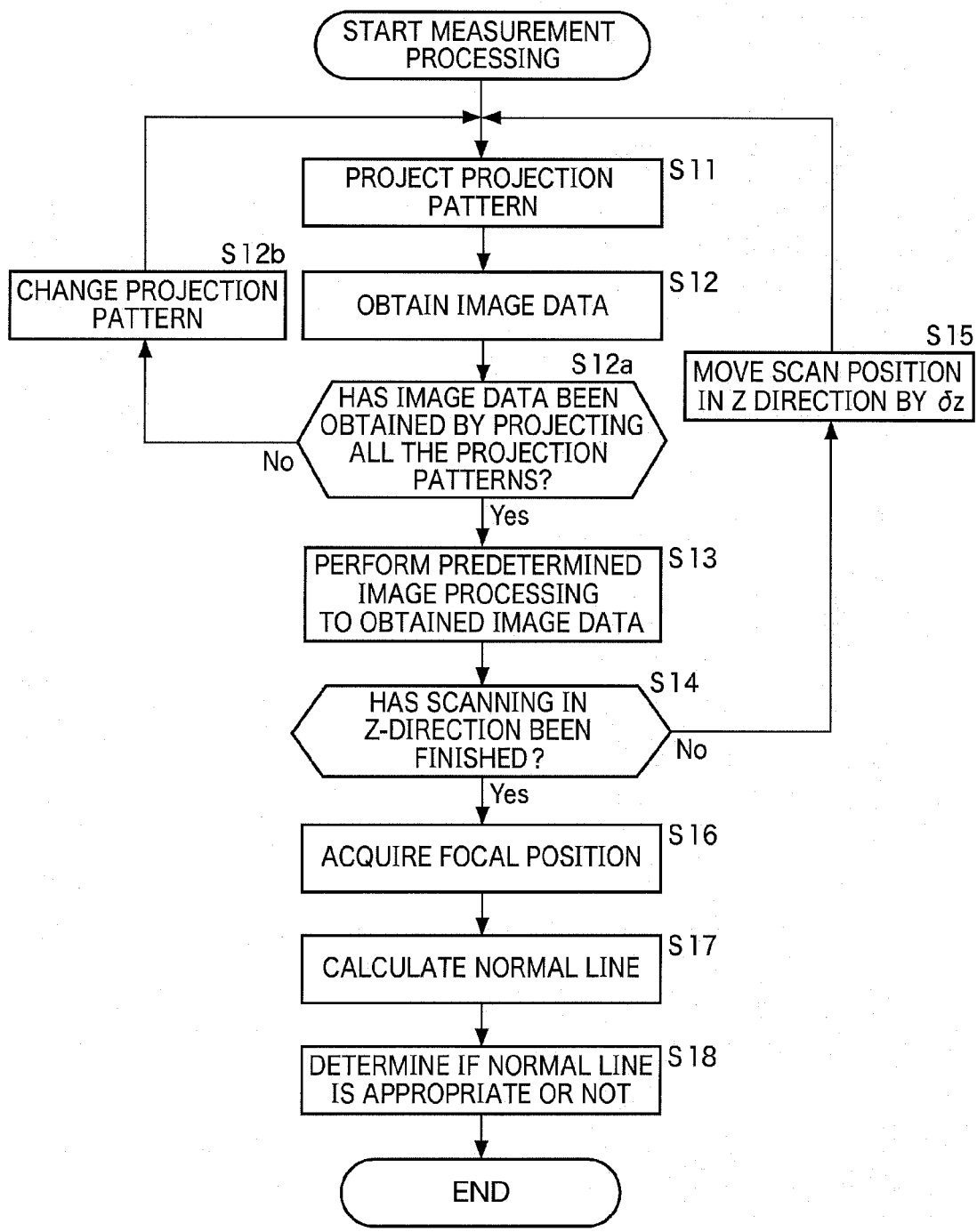
FIG. 7 is a flowchart for explaining measurement processing.

Specifically, the controller 23 makes each shaft driving control portion, not shown, drive the measuring portion 21 as necessary so that the elevation angle and the rotation angle of the measurement system become 0 degrees, respectively, and the measurement system is inclined. After that, the measurement processing at a predetermined angle to the object 2 to be measured is started, and details of the processing will be described here referring to a flowchart in FIG. 7. That is, the measurement processing shown in the flowchart in FIG. 7 is processing corresponding to the processing at Step S1 in FIG. 6.

At Step S11, the measuring portion 21 projects any one of the projection patterns whose intensities are changed in three striped sinusoidal states of 0, 120, and 240 degrees according to the position to the object 2 to be measured.

That is, the controller 23 transmits a control signal to a liquid crystal element control portion (not shown) that controls the liquid crystal element 35 so as to generate a pattern which has not been projected yet in the three projection patterns. Upon receipt of the signal, the liquid crystal element control portion generates any one of the three projection patterns with the initial phases of 0, 120, and 240 degrees in the liquid crystal element 35. The pattern is projected to the object 2 to be measured through the above-described projection optical system.

In this embodiment, the example of projection of a sinusoidal pattern as a projection pattern is explained, but a pattern other than a sinusoidal wave such as a triangular wave, for example, may be projected. The patterns other than the sinusoidal wave are also reported in the following document (1), for example: (1) P. Jia, J, Kofman, and C. English, "Multiple-step triangular-pattern phase shifting and the influence of number of steps and pitch on measurement accuracy".

Also, as the projection pattern, in this embodiment, the pattern whose intensity is changed in the three sinusoidal states with initial phases of 0, 120, and 240 degrees in accordance with the position is explained to be projected, but the number of projection patterns are not limited to 3 types but it is only necessary that two or more patterns with shifted initial phases are projected. For example, if the projection pattern whose intensity is changed in the sinusoidal state in accordance with the position is used, it is only necessary that two patterns with the phases shifted by 90 degrees are projected. However, though the position on the image surfaces can be specified by two types of patterns, in order to specify a position more accurately, it is ideal to project three types of cyclic patterns with different initial phases.

At Step S12, the controller 23 obtains image data of the object 2 to be measured that can be obtained by projecting the projecting pattern.

That is, the CCD sensor 44 and the CCD sensor 50 obtains the image data that can be obtained by converting the light which forms an image on the light receiving surface into an electric signal, respectively, and supplies it to the image processing portion 22.

Then, at Step S12a, the three types of cyclic patterns with different initial phases are projected, and it is determined if the image data of the object 2 to be measured was obtained or not, respectively. Also, at this time, not only do the three types of the striped patterns in one direction need to be projected but also the image data needs to be obtained for the striped pattern in the direction orthogonal to the one direction respectively, and six pieces in total of the image data are obtained by the CCD sensor 44, and it is determined if the image data has been obtained or not. The CCD sensor 50 also obtains six pieces of image data in total.

Also, at Step S12b, if there is image data which has not been obtained yet, the projection pattern is changed and the routine returns to Step 11. If six pieces in total of the image data have been obtained here, the routine goes to Step S13.

At Step S13, the image processing portion 22 applies the predetermined image processing to each of the image data supplied from each of the CCD sensor 44 and the CCD sensor 50 and supplies it to the controller 23.

Into the image processing portion 22, image data of the object 2 to be measured to which the three striped sinusoidal projection patterns extending in the X-direction and the three striped sinusoidal projection pattern extending in the Y direction are projected is inputted, but the image processing executed for the image data obtained by stripe projection in the Y direction will be described here. As for the X-direction, since the processing is totally the same, the description will be omitted.

That is, as mentioned above, the image processing portion 22 has the configuration shown in FIG. 4, the FFT portion 71 applies FFT (Fast Fourier Transform) to each line aligned in the X-direction and extending in the Y-direction, expands it to a frequency space and outputs it to the filter 72 on the basis of the image data obtained by striped projection in the Y-direction.

Here, the stripes picked up by the CCD sensor 44 and the CCD sensor 50 are subjected to modulation by irregularity on the surface of the object 2 to be measured. That is, in an unfocused portion, amplitude appears small, while in a focused portion, the amplitude appears large. If the sinusoidal wave whose amplitude is modulated is expanded to a frequency as above, a component obtained by adding/subtracting a frequency component fm of the amplitude change to the frequency of a projected stripe appears in addition to the frequency fc of the projected stripe (this phenomenon is widely known as amplitude modulation in the field of radio-wave communication).

That is, since the spatial frequency of the image on the surface of the object 2 to be measured can be expected in advance from CAD (Computer Aided Design) data or the like in many cases, by cutting off the frequency component other than a region from fc−fm to fc+fm, it becomes possible to control unnecessary noises. The spatial frequency of the image on the surface of the object 2 to be measured is appropriately set by the controller 23 on the basis of CAD data or the like, for example.

In the image processing portion 22, the frequency component other than the range from fc−fm to fc+fm in the spatial frequency expanded by the FFT 71 is cut off by the filter 72, and the remaining frequency component is outputted to the inverse FFT portion 73. As a result, accidental noise can be efficiently eliminated.

Actually, there may be a case in which unexpected displacement of the object 2 to be measured needs to be measured, and in that case, it is possible to set fm slightly wider than a value expected from the CAD data of the object 2 to be measured. Also, it is possible to apply filtering by an appropriate window function in the frequency space.

As mentioned above, the signal whose noise was eliminated by the filter 72 in the frequency space is inputted to the inverse FFT portion 73. The inverse FFT portion 73 applies inverse FFT to the signal whose noise was eliminated, expands it to the image data on the actual space and outputs it to the controller 23.

Since the image obtained as above originally has three projection patterns, brightness I at each point (x, y) is expressed by the following expression (1), supposing that environmental light at each point is a, reflection light is b, and a phase, which is information indicating to what position of the sinusoidal projection pattern the portion projected to a pixel at each point corresponds is φ:
[Numerical Expression 1]

$$I1_x(x, y) = a(x, y) + b(x, y)\cos(\phi(x) - 2\pi/3)$$

$$I2_x(x, y) = a(x, y) + b(x, y)\cos(\phi(x))$$

$$I3_x(x, y) = a(x, y) + b(x, y)\cos(\phi(x) + 2\pi/3)$$

$$I1_y(x, y) = a(x, y) + b(x, y)\cos(\phi(y) - 2\pi/3)$$

$$I2_y(x, y) = a(x, y) + b(x, y)\cos(\phi(y))$$

$$I3_y(x, y) = a(x, y) + b(x, y)\cos(\phi(y) + 2\pi/3) \quad (1)$$

In the expression (1), $I1_x$, $I2_x$, and $I3_x$ indicate striped projection patterns in which the stripe extends in the Y-direction, while $I1_y$, $I2_y$, and $I3_y$ indicate striped projection patterns in which the stripe extends in the X-direction.

Also, as for the phase φ indicating the position of the projection pattern projected to each pixel, φ(x) can be acquired by three expressions of the striped projection patterns in which the stripe extends in the Y-direction and Φ(y) can be acquired by three expressions of the striped projection patterns in which the stripe extends in the X-direction using the following expression (2):
[Numerical Expression 2]

$$\phi(x) = \arctan(\sqrt{3} \times (I1_x - I3_x)/(2I2_x - I1_x - I3_x))$$

$$\phi(y) = \arctan(\sqrt{3} \times (I1_y - I3_y)/(2I2_y - I1_y - I3_y)) \quad (2)$$

The processing for the image data obtained by striped projection in the Y direction has been described above, and the similar processing is applied also to the image data obtained by the striped projection in the X-direction.

As mentioned above, using the plural projection patterns whose intensities are changed in the sinusoidal state with different initial phases, to what position in the projection pattern the pattern picked up at each pixel corresponds can be known.

Subsequently, the controller 23 determines if scanning in the Z-direction, which is the optical axis direction of the objective lens 38 has been finished or not at Step S14, and if the movement in the Z-direction has not been finished, the scan position is moved in the Z-direction only by δz at Step S15. Then, until it is determined at Step S14 that the scanning in the Z-direction has been finished, the above-described processing from Step S11 to Step S15 is repeated.

Specifically, in the shape measuring device 1, by sequentially driving the Z-axis guide 17 in the Z-direction by δz each, for example, the measuring portion 21 makes a change of δz each in the Z-direction, moves the position conjugated with the CCD sensor 44 and the CCD sensor 50 along the optical axis direction of the objective lens 38, and obtains the image data obtained by projecting the striped projection patterns whose intensities are changed according to the position in the three sinusoidal states of 0, 120, and 240 degrees for each δz in the X-direction (lateral stripe) and the Y-direction (vertical stripe). Then, the image data is subjected to the processing to remove the noise component in the image processing portion 22 and then, inputted to the controller 23.

When the change in the Z-direction is finished, at Step S16, the focal-position calculation portion 81 acquires a focal position on the basis of the image data from the image processing portion 22.

Specifically, first, the focal-position calculation portion 81 compares the image data of the same Z-positions for the images picked up by the CCD sensor 44 and the CCD sensor 50 and calculates the Z-positions on the respective XY-coordinate. The method is such that a phase value Φ1x (a value obtained on the basis of the image when the projection pattern whose stripe extends in the X direction is used) at the Z-position and Φ1y (a value obtained on the basis of the image when the projection pattern whose stripe extends in the Y direction is used) are respectively acquired for each pixel position from the image data obtained by the CCD sensor 44 from the expression (2). Similarly, phase values Φ2x and Φ2y are acquired for the CCD sensor 50.

The sum of the right and left pupils are expressed by the following expression (3):
[Numerical Expression 3]

$$\phi x(n) = (\phi 1x(n) + \phi 2x(n0))/2$$

$$\phi y(n) = (\phi 1y(n) + \phi 2y(n0))/2 \quad (3)$$

However, in the expression (3), n is an image number in the vicinity of the focal surface.

Here, since the image forming positions of the right and left pupils match each other on the focal point surface, in order to determine the focal position, it is only necessary to acquire the Z-position where the two relationships in the following expression (4) holds true for the pixels picking up the same position of the CCD 44 and the CCD 50:

[Numerical Expression 4]

$$\phi 1x(n)=\phi 2x(n)$$

$$\phi 1y(n)=\phi 2y(n) \quad (4)$$

Actually, considering device coefficients such as light-receiving sensitivity characteristics and the like of the CCD sensor, the position that satisfies the relationships in the expression (4) is acquired.

As mentioned above, focusing is detected, and measurement data on the basis of the focal position is obtained.

Subsequently, it is checked if the normal line of the object 2 to be measured is within an allowable range of measurement or not.

At Step S17, the normal-line calculation portion 82 acquires displacement of the normal line of the surface from the phase shift when Z-direction is scanned on the basis of the calculation result by the focal-position calculation portion 81.

Figure 8:
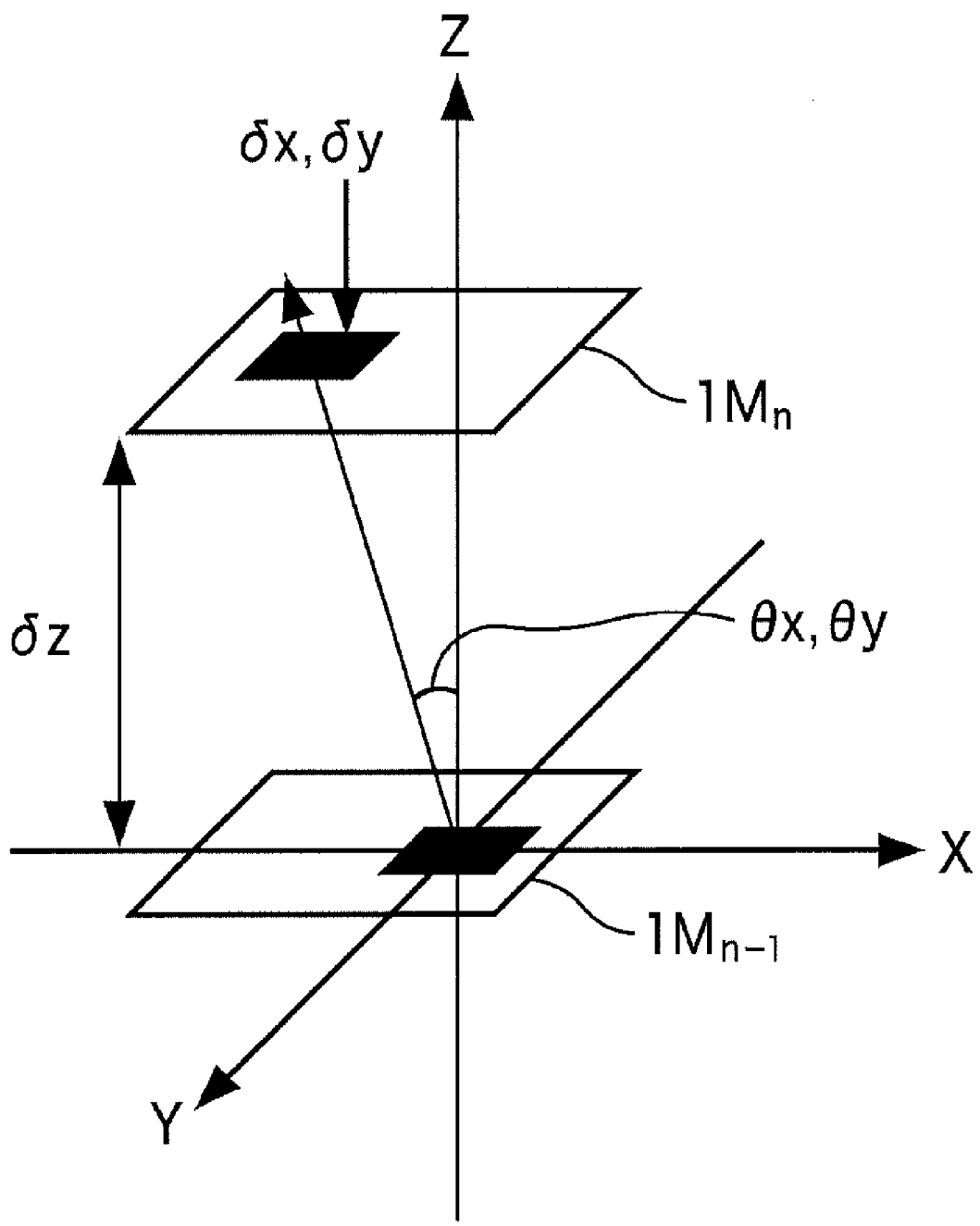
FIG. 8 is a diagram for explaining displacement of a normal line.

For example, as shown in FIG. 8, during scanning in the Z-direction, an image picked up at the n-1-th time is made an image $IM_{n-1}$ on the XY-axis and after being moved in the Z-direction only by δz, an image picked up at the n time is made an image $IM_n$, and then, a given pixel (a black square in the figure) is shifted by δx in the X-direction and δy in the Y direction by the movement of δz. Supposing that the phase shift at this time is θx and θy, the phase shift per unit Z (δz) can be acquired by the following expression (5):

[Numerical Expression 5]

$$\theta x=(\phi x(n)-\phi x(n-1))/2\pi\times P/\delta Z$$

$$\theta y=(\phi y(n)-\phi y(n-1))/2\pi\times P/\delta Z \quad (5)$$

However, in the expression (5), P is a pitch of the projected light stripe on the surface of the object to be measured.

As mentioned above, by acquiring the phase shift (θx, θy) per unit Z, the displacement of the normal line can be acquired.

At Step S18, the normal-line appropriateness determination portion 83 determines if the phase shift (θx, θy) is within the appropriate range or not for each pixel on the basis of the calculation result by the normal-line calculation portion 82 so as to determine if the measurement result is reliable or not.

That is, in the shape measuring device 1, if θx and θy do not become appropriate values with respect to the mirror surface, the focal depth becomes deep, and accurate measurement cannot be made. Thus, it is determined if the values are within the appropriate range or not. The appropriate values can be usually acquired from NA of the optical system, and if an angle at which the measurement accuracy becomes ½ is set as a threshold value, for example, the displacement of the normal line to NA 0.3 is allowed up to approximately 8.5 degrees.

As mentioned above, the normal line direction with respect to each measured pixel is checked by the normal-line appropriateness determination portion 83. That is, in this embodiment, since the phase has been acquired during focusing detection, the normal line direction is calculated and determined on the basis of the phase and the result is used for the entire sequence of the measurement processing. As a result, data without reliability in the measurement values can be eliminated.

A target of the determination processing by the normal-line appropriateness determination portion 83 may be all the measurement points or only measurement points in a predetermined region can be used as the targets of the determination processing.

As mentioned above, the measurement processing at a predetermined angle is performed for the object 2 to be measured.

After that, the processing returns to the processing at Step S1 in FIG. 6, and the processing at Step S2 and after is performed. That is, at Step S2, the controller 23 determines if a pixel outside the allowable range is present or not on the basis of the determination result by the normal-line appropriateness determination portion 83.

At Step S2, if it is determined that a pixel outside the allowable range is present, at Step S3, the shape measuring device 1 performs the measurement processing by changing the angle with respect to the object 2 to be measured. Specifically, the controller 23 drives the measuring portion 21 so that an elevation angle and a rotation angle at which the largest number of pixels determined as being outside the allowable range are measured in the processing for checking the normal line direction with respect to each pixel (processing at Step S18), for example, and inclines the measurement system. If the measurement system is inclined, similarly to the processing at the above-mentioned Step S1, the measurement processing is executed while scanning in the Z-direction is performed.

In the measurement processing after the inclination, the angle to incline the measurement system may be an appropriate angle by which the pixel found out to be outside the allowable range during check of the normal line direction can be measured again such as an angle by which all the measurement points can be measured without fail from two or more directions, for example. Also, the stage 12 may be inclined instead of the measurement system.

On the other hand, if it is determined at Step S2 that there is no pixel outside the allowable range, since it is only necessary to use the pixel in the allowable range as it is, the processing at Step S3 is skipped, and the processing goes to Step S4.

At Step S4, the controller 23 selects a point-group data for each pixel on the basis of the determination result by the normal-line appropriateness determination portion 83. That is, the controller 23 compares the displacement of the normal line before inclination of the measurement system and the displacement of the normal line after the inclination for each pixel and selects measurement data obtained by scanning in the Z-direction of the smaller displacement amount. At Step S2, if it is determined that all are pixels in the allowable range, since the measurement processing after the inclination has not been performed, the measurement data obtained in the processing at Step S1 before the inclination is selected as it is.

Since the measurement data selected as above has an inclination angle of the normal line on the surface of the object 2 to be measured with respect to the optical axis of the objective lens 38 at measurement smaller, the data has higher measurement accuracy in the two pieces of measurement data. By synthesizing the measurement data selected for each pixel as above, a point-group data made up by the measurement data selected for each pixel can be obtained.

At Step S5, the controller 23 outputs the obtained point-group data as the measurement result of the three-dimensional shape of the object 2 to be measured, and the shape measurement processing is finished.

As described above, by projecting a plurality of patterns with different brightness and by making measurements of the shape using an intensity ratio or an intensity difference of the patterns, even if the picked-up pattern has been moved by movement of the image pickup element with respect to the optical axis direction, a pattern to be evaluated can be specified. Therefore, since the position of the pattern can be specified with a resolution smaller than the cycle of the projected pattern, the inclined state of the object to be measured can be evaluated with a high resolution for all the regions. Moreover, the resolution in the lateral direction which has been limited can be improved to the same degree as the pixel.

Also, by using the phase acquired in focusing detection, the normal line direction at each point is calculated and determined and the result is used for the entire sequence of the measurement processing so that the measurement accuracy can be improved.

The above-described series of processing can be executed by hardware or can be executed by software. If the series of processing is to be executed by software, a program constituting the software is installed from a recording medium into a computer incorporated in exclusive hardware or a general-purpose personal computer or the like that can execute various functions by installing various programs.

This recording medium is constituted not only by a magnetic disc (including a flexible disc), an optical disc (including CD-ROM (Compact Disc-Read Only Memory) and DVD (Digital Versatile Disc)), magnet-optical disk, a semiconductor memory or the like in which the program is recorded, distributed in order to provide a user with the program separately from the computer but also a ROM (Read Only Memory), a storage device and the like in which the program is recorded, provided to a user in a state incorporated in the computer in advance.

Also, the program that makes the above-described series of processing executed may be installed in the computer through a wired or a wireless communication medium such as a local area network, the Internet, and digital satellite broadcasting through an interface such as a router, a modem and the like as necessary.

In this description, the steps describing the program stored in the recording medium include not only the processing executed in a time series along the described order but also the processing executed in parallel or individually, not necessarily executed in a time series.

Also, the embodiment of the present invention is not limited to the above-described embodiment but is capable of various changes within a range not departing from the gist of the present invention.

The invention claimed is:

1. A shape measuring device having a projecting system that projects a projection pattern to a surface to be measured; an image-forming optical system that forms an image of said projection pattern projected to said surface to be measured;
   an image pickup device that picks up the image of said projection pattern formed by the image-forming optical system; and a focusing detecting device that detects a focusing state of the image picked up by said image pickup device, and that measures a shape of said surface to be measured, the shape measuring device comprising:
   a computer operable to provide:
     a conjugated position changing device that changes a position conjugated with an image pickup surface of said image pickup device with respect to said surface to be measured along an optical axis direction of the image-forming optical system;
     a calculating device that detects a change of position of said projection pattern on the basis of a plurality of images obtained by said image pickup device when said conjugated position is changed with respect to said surface to be measured; and
     an evaluating device that evaluates a detection error of the focusing state detected by said focusing detecting device on the basis of the change of the position of the projection pattern detected by said calculating device.

2. The shape measuring device according to claim 1, wherein said projection pattern is a pattern having a cyclic nature.

3. The shape measuring device according to claim 2, wherein
   said projecting system projects three or more of sinusoidal patterns with different brightness at a same projection position as said projection pattern.

4. The shape measuring device according to claim 1, wherein
   said calculating device estimates a normal line of said surface to be measured from the change of the position of said projection pattern when said conjugated position is changed.

5. The shape measuring device according to claim 4, wherein
   said calculating device determines if a direction of the normal line is within a predetermined range or not and if the direction of the normal line is determined to be outside the predetermined range, the calculating device prompts a user to make re-measurement in a state in which directions of said image-forming optical system and said surface to be measured are changed.

6. The shape measuring device according to claim 2, wherein the computer is operable to further provide a spatial frequency selecting device that:
   expands a picked up image for each constituting spatial frequency component;
   cuts off a frequency component other than for a region of the spatial frequency obtained by adding/subtracting a spatial frequency according to a surface state of the surface to be measured set in advance to/from the spatial frequency component of said projection pattern with respect to the expanded spatial frequency; and
   re-expands a frequency response obtained by cutting off said frequency component to a spatial coordinate.

7. The shape measuring device according to claim 1, wherein
   said image-forming optical system is provided with diaphragms with different aperture regions that shield a half of an optical path of said image-forming optical system at a pupil position thereof or a position conjugated with said pupil position;
   said image pickup device obtains two images at a position where the conjugated position is the same as said image pickup surface in a state in which regions shielded by said diaphragms are different; and
   said focusing detecting device detects the focusing state between said surface to be measured and the image pickup surface of said image pickup device on the basis of presence of a position change of the projection pattern obtained from said two images.

8. The shape measuring device according to claim 2, wherein
   said calculating device estimates a normal line of said surface to be measured from the change of the position of said projection pattern when said conjugated surface is changed along said optical axis direction.

9. The shape measuring device according to claim 3, wherein
said calculating device estimates a normal line of said surface to be measured from the change of the position of said projection pattern when said conjugated surface is changed.

10. The shape measuring device according to claim 3, wherein the computer is operable to further provide a spatial frequency selecting device that:
expands a picked up image for each constituting spatial frequency component;
cuts off a frequency component other than for a region of the spatial frequency obtained by adding/subtracting a spatial frequency according to a surface state of the surface to be measured set in advance to/from the spatial frequency component of said projection pattern with respect to the expanded spatial frequency; and
re-expands a frequency response obtained by cutting off said frequency component to a spatial coordinate.

11. The shape measuring device according to claim 2, wherein
said image-forming optical system is provided with diaphragms with different aperture regions that shield a half of an optical path of said image-forming optical system at a pupil position thereof or a position conjugated with said pupil position;
said image pickup device obtains two images at a position where the conjugated position is the same as said image pickup surface in a state in which the regions shielded by said diaphragms are different; and
said focusing detecting device detects the focusing state between said surface to be measured and the image pickup surface of said image pickup device on the basis of presence of a position change of the projection pattern obtained from said two images.

12. The shape measuring device according to claim 3, wherein
said image-forming optical system is provided with diaphragms with different aperture regions that shield a half of an optical path of said image-forming optical system at a pupil position thereof or a position conjugated with said pupil position;
said image pickup device obtains two images at a position where the conjugated position is the same as said image pickup surface in a state in which regions shielded by said diaphragms are different; and
said focusing detecting device detects the focusing state between said surface to be measured and the image pickup surface of said image pickup device on the basis of presence of a position change of the projection pattern obtained from said two images.

13. A shape measuring device having a projecting system that projects a projection pattern to a surface to be measured; an image-forming optical system that forms an image of said projection pattern projected to said surface to be measured; an image pickup device that picks up the image of said projection pattern formed by the image-forming optical system; and a focusing detecting device that detects a focusing state of the image picked up by said image pickup device, and that measures a shape of said surface to be measured, the shape measuring device comprising:
means for changing a position conjugated with an image pickup surface of said image pickup device with respect to said surface to be measured along an optical axis direction of the image-forming optical system;
means for detecting a change of position of said projection pattern on the basis of a plurality of images obtained by said image pickup device when said conjugated position is changed with respect to said surface to be measured; and
means for evaluating a detection error of the focusing state detected by said focusing detecting device on the basis of the change of the position of the projection pattern detected by said means for detecting.

14. An apparatus for use with a projecting system that projects a projection pattern to a surface to be measured; an image-forming optical system that forms an image of said projection pattern projected to said surface to be measured; an image pickup device that picks up the image of said projection pattern formed by the image-forming optical system; and a focusing detecting device that detects a focusing state of the image picked up by said image pickup device, the apparatus comprising:
a computer operable to provide:
a conjugated position changing device that changes a position conjugated with an image pickup surface of said image pickup device with respect to said surface to be measured along an optical axis direction of the image-forming optical system;
a detecting device that detects a change of position of said projection pattern on the basis of a plurality of images obtained by said image pickup device when said conjugated position is changed with respect to said surface to be measured; and
an evaluating device that evaluates a detection error of the focusing state detected by said focusing detecting device on the basis of the change of the position of the projection pattern detected by the detecting device;
wherein the computer determines a shape of the surface to be measured in accordance with the evaluated detection error.

* * * * *

UNITED STATES PATENT AND TRADEMARK OFFICE
CERTIFICATE OF CORRECTION

PATENT NO. : 8,314,849 B2  
APPLICATION NO. : 12/879712  
DATED : November 20, 2012  
INVENTOR(S) : Tomoaki Yamada Page 1 of 1

It is certified that error appears in the above-identified patent and that said Letters Patent is hereby corrected as shown below:

Column 17, Line 29, In Claim 11, delete "which the" and insert -- which --, therefor.

Signed and Sealed this  
Twelfth Day of March, 2013

Teresa Stanek Rea  
*Acting Director of the United States Patent and Trademark Office*